E. E. WEMP.
DRIVE AXLE.
APPLICATION FILED FEB. 9, 1918.
1,292,185.
Patented Jan. 21, 1919.
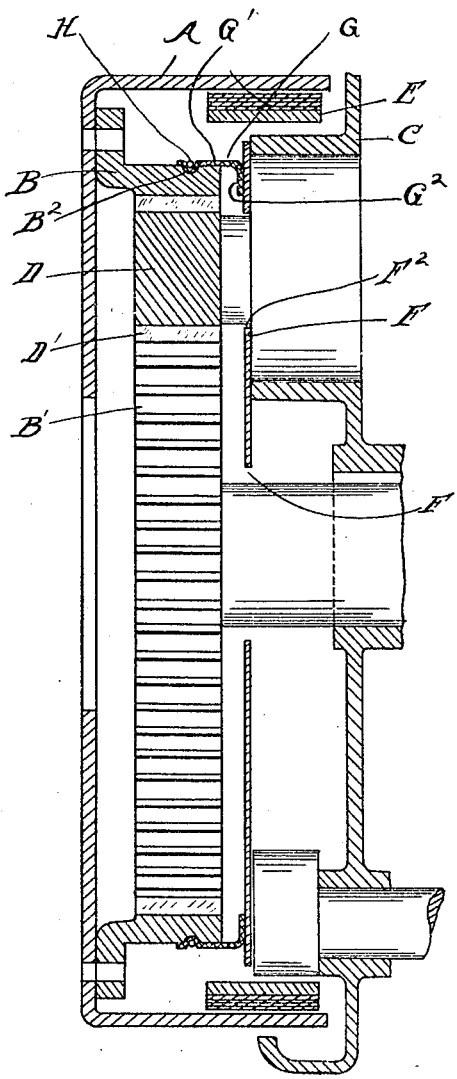
Inventor
Ernest E. Wemp
By Whittemore Hulbert & Whittemore
Attorneys

UNITED STATES PATENT OFFICE.

ERNEST E. WEMP, OF DETROIT, MICHIGAN.

DRIVE-AXLE.

1,292,185.  Specification of Letters Patent.  Patented Jan. 21, 1919.

Application filed February 9, 1918. Serial No. 216,212.

*To all whom it may concern:*

Be it known that I, ERNEST E. WEMP, a citizen of the United States of America, residing at Detroit, in the county of Wayne and State of Michigan, have invented certain new and useful Improvements in Drive-Axles, of which the following is a specification, reference being had therein to the accompanying drawings.

The invention relates to drive axles of that type in which an internal gear drive is employed, and comprises the peculiar arrangement and construction of means for separating the space within which the brake-band is located, from the space within the internal gear.

In the drawings:

The figure is a sectional view of the drive axle with parts omitted.

A is the brake drum and B the concentric internal gear within said drum, both the drum and gear being adapted to be secured to a drive wheel (not shown). C is the brake head in which is mounted the drive pinion D having the teeth D' engaging the teeth B' upon the gear B. E is the internal brake within the brake drum A and between the same and the gear B.

It is essential in the above construction to have the coöperating teeth of the gear and drive pinion thoroughly lubricated and at the same time to have the coöperating contacting surfaces of the brake-band and drum free of lubricant. I accomplish these results by separating the space within the brake drum into two compartments by means of the following construction: F is the metal wall connected to the brake head C and spaced from the side faces of the gear B. This wall extends to adjacent the inner periphery of the brake E and is provided with the apertures F' and F² respectively for the passage of the head and live axles (not shown), the latter of which carries the drive pinion D. G is a self-adjustable cup-shaped member formed of leather or suitable fibrous material, having the annular flange G' connected to the internal gear B and the radially inwardly extending flange G² lying adjacent to and contacting with the wall F. The annular flange G' preferably surrounds the outer periphery B' of the internal gear and is connected thereto by the band H surrounding the same and adapted to force the same into the annular groove B² in the gear B.

In operation the coöperating cup-shaped member and wall effectively retain the lubricant and prevent the same from leaking out upon the brake. Furthermore the arrangement is such that the centrifugal action of the drive wheel and lubricant forces the radially inwardly extending flange more tightly against the wall.

What I claim as my invention is:

1. In a drive axle, the combination with the brake drum, of an internal gear located within and concentrically of said brake drum, a wall spaced from the adjacent side face of said gear and a self-adjustable packing member between said gear and wall and secured to one of said members and having a radially inwardly extending flange bearing against the other.

2. In a drive axle, the combination with the brake drum of a concentric internal gear located within said brake drum, a wall spaced from the adjacent side face of said gear and a self-adjustable packing member secured to said gear and having a radially inwardly extending flange bearing against said wall.

3. In a drive axle, the combination with the brake drum, of an internal gear located within and concentrically of said brake drum, a wall spaced from the adjacent side face of said gear, and a self-adjustable packing member secured to the outer periphery of said gear and having an annular radially inwardly extending flange bearing against said wall.

4. In a drive axle, the combination with the brake drum, of an internal gear located within and concentrically of said brake drum, a wall spaced from the adjacent side face of said gear, a self-adjustable packing member having a radially inwardly extending flange bearing against said wall and a peripheral flange bearing against the outer periphery of said gear, and a band for securing the same upon said gear.

5. In a drive axle, an axle member, an internal gear mounted rotatably thereon, a wall spaced from the adjacent side face of said gear and a self-adjustable packing member between said gear and wall and secured to one of said members and having a radially inwardly-extending flange bearing against the other.

6. In a drive axle, the combination with the brake drum of a concentric internal gear located within said brake drum, a wall spaced from the adjacent face of said gear and a self-adjustable packing member between said gear and wall operable to maintain pressure between the wall and packing member by the centrifugal action of the latter.

7. In a drive axle, an axle member, an internal gear rotatably mounted thereon, a wall spaced from the adjacent face of said gear, and rotatable packing means operable to maintain pressure between said wall and packing means by the centrifugal action of the latter.

In testimony whereof I affix my signature.

ERNEST E. WEMP.

Copies of this patent may be obtained for five cents each, by addressing the "Commissioner of Patents, Washington, D. C."